US006286715B1

(12) United States Patent
Ziesel et al.

(10) Patent No.: US 6,286,715 B1
(45) Date of Patent: Sep. 11, 2001

(54) TRANSPARENT FRONT VENDING MACHINE

(75) Inventors: Lawrence B. Ziesel, Woodstock; John S. Miller, Fayetteville; Michael C. Mayne, Snellville, all of GA (US); Daniel J. Bowen; John W. Jasmin, both of Aiken, SC (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/571,504

(22) Filed: May 15, 2000

Related U.S. Application Data

(63) Continuation-in-part of application No. 09/283,573, filed on Apr. 1, 1999.

(51) Int. Cl.[7] ................................ B23Q 7/12; B65H 9/00

(52) U.S. Cl. .......................... 221/171; 221/172; 221/253; 221/273

(58) Field of Search .................................... 221/171, 172, 221/195, 191, 253, 273

(56) References Cited

U.S. PATENT DOCUMENTS

| | | | | |
|---|---|---|---|---|
| 3,294,282 | | 12/1966 | Brown | 221/130 |
| 3,348,732 | * | 10/1967 | Schwarz | 221/171 X |
| 4,108,333 | * | 8/1978 | Falk et al. | 221/13 X |
| 4,252,250 | * | 2/1981 | Toth | 221/13 X |
| 4,717,044 | * | 1/1988 | Suzuki et al. | 221/273 X |
| 4,986,441 | * | 1/1991 | Kanbe et al. | 221/130 X |
| 5,048,719 | | 9/1991 | Empl et al. | 221/119 |
| 6,199,720 | * | 3/2001 | Rudick et al. | 221/6 X |

FOREIGN PATENT DOCUMENTS

| | | |
|---|---|---|
| 2533811 | 4/1984 | (FR) . |
| 1-246698 | 10/1989 | (JP) . |
| 1-250194 | 10/1989 | (JP) . |
| 1-253093 | 10/1989 | (JP) . |
| 1-287793 | 11/1989 | (JP) . |
| 2-183891 | 7/1990 | (JP) . |
| WO 91/01536 | 2/1991 | (WO) . |

* cited by examiner

*Primary Examiner*—Christopher P. Ellis
*Assistant Examiner*—Gene O. Crawford
(74) *Attorney, Agent, or Firm*—Finnegan, Henderson, Farabow, Garrett & Dunner, L.L.P.

(57) ABSTRACT

A vending machine for increasing consumer interest in the vending process and vended product includes a tipping mechanism. The tipping mechanism is positioned at a first end of a shelf, and modifies the orientation of an article being delivered from the shelf to a conveyor. The tipping mechanism causes the article to be tipped from an upright orientation to a perpendicular, lateral orientation. The tipping mechanism includes a ramp supported by the shelf, a spacer that provides the ramp with an incline from the shelf, and a product rotator extending from the shelf toward the conveyor. The conveyor then delivers the article to a vend port, where it is dispensed in the upright position. The conveyor may be mounted on internal elevator that carries the conveyor between one or more shelves and the vend port. A transparent window is provided on the face of the vending machine whereby a consumer can view the dispensing operations.

34 Claims, 10 Drawing Sheets

TRANSPARENT FRONT VENDING MACHINE

CROSS-REFERENCE TO RELATED APPLICATION

This application is a continuation-in-part of U.S. patent application Ser. No. 09/283,573 filed on Apr. 1, 1999, the content of which is relied upon and incorporated by reference.

BACKGROUND OF THE INVENTION

1. Field of the Invention

The present invention relates to a vending machine having an elevator for transporting products to a vend port. A transparent window is provided in the face of the machine such that the consumer can see the dispensing operation.

2. Description of the Background Art

Conventionally vending machines have a closed front such that the internal operation of the machine is not visible to the consumer. Conventional vending machines which do have transparent faces which drop articles into a bin in the lower front portion of the machine. The consumer can then reach into the bin and withdraw the products after viewing the vend operation. However, for certain products, such a vending operation is unacceptable. For example, if beverages, and in particular, carbonated beverages, were to be dispensed, this dropping operation would unsatisfactorily shake-up the product.

Other vending machines are known wherein an internal elevator lowers articles to a discharge port. For example, U.S. Pat. No. 4,108,333 discloses a vending machine with an interior elevator for lowering selected articles from a storage shelf to a vend port. The operation is visible through a front window of the vending machine. This arrangement, however, is primarily used for food products, such as sandwiches, salads, lunch platters and dessert items. These items will slide onto the elevator from their storage shelf. Because the items generally have a low center of gravity, they will not tip over. However, when dispensing certain items such as beverage containers, the center of gravity is higher than that contemplated for items dispensed in this U.S. Pat. No. 4,108,333. Thus, if beverage bottles, cans or juice boxes were attempted to be dispensed from this known vending machine, they would likely tip over. Moreover, no provision of horizontal movement of the elevators is provided in this known machine and as such, a rather large and awkward vend port is required.

Accordingly, a need in the art exists for a simple and effective transparent front vending machine that avoids the drawbacks of the prior art machines. This vending machine should increase consumer interest in the vending process and the vended product in order to thereby increase sales.

SUMMARY OF THE INVENTION

Accordingly, the primary object of the present invention is to provide a transparent front vending machine that will display the vending process to attract consumer interest.

A further object of the present invention is to provide a vending machine that has an interior elevator that moves the product both vertically and horizontally.

Still another object of the present invention is to provide a vending machine with an elevator that has either a powered conveyor or a tilt slide mechanism for moving vended objects to a vend port.

A further object of the present invention is to provide a vending machine that can dispense products, such as beverage cans or containers, in a desired orientation without unnecessarily shaking them.

To this end, a further object of the present invention is to provide a vending machine that can dispense elongated products in an upright position, if so desired.

Yet another object of the present invention is to provide a vending machine which will fully display all rows of items to be vended and wherein the vending mechanism will not obstruct this display.

Yet another object of the present invention is to provide a method for dispensing articles which will provide an attractive display for generating consumer interest in the vended product.

Still another object of the present invention is to provide a vending machine which is simple to operate and easy to maintain.

These and other objects of the present invention are fulfilled by providing a vending machine comprising at least one shelf for holding articles; an elevator vertically movable relative to the at least one shelf, the elevator having a bottom member; a conveyor mounted on the elevator for transporting articles from the at least one shelf, the conveyor being horizontal, articles on the conveyor being movable relative to the bottom member of the elevator during transport by the conveyor, both the conveyor and the bottom member of the elevator being vertically movable with the elevator; and a vend port for receiving articles from the elevator and for discharging articles from the vending machine, the horizontal conveyor enabling articles to remain in an upright position during transport to the vend port.

Moreover, these and other objects of the present invention are further provided by a vending machine comprising at least one shelf for holding articles; an elevator vertically movable relative to the at least one shelf, the elevator having a bottom member, articles being deliverable from the at least one shelf to the elevator in a first direction; a conveyor mounted on the elevator, the conveyor being movable relative to the bottom member of the elevator, the conveyor being movable in a second direction which is perpendicular to the first direction, both the conveyor and the bottom member of the elevator being vertically movable with the elevator; and a vend port for receiving articles from the elevator and for discharging articles from the vending machine, the vend port being in a front face of the vending machine, the first direction being a direction toward the front face of the vending machine.

Additionally, these and other objects of the present invention are fulfilled by a method of vending articles from a vending machine comprising the steps of displaying articles on the shelves of the vending machine; releasing a selected article from one of the shelves to an elevator within the vending machine; vertically transporting the selected article on the elevator within the vending machine; horizontally transporting the selected article on the elevator, the selected article moving relative to a bottom member of the elevator; discharging the selected article from the vending machine; and continually displaying the selected article during the steps of releasing, vertically transporting and horizontally transporting, the selected article being visible through a window provided in the vending machine.

In another aspect, the vending machine includes a shelf for holding articles in a substantially upright orientation and a tipping mechanism positioned at a first end of the shelf. The tipping mechanism modifies an orientation of an article being delivered from the shelf to a conveyor. The substantially horizontal conveyor is positioned adjacent the first end of the shelf and receives the article delivered from the shelf. The vending machine also includes a vend port for receiving the article from the conveyor and accommodating the discharge of the article from the vending machine in a substantially upright orientation.

In yet another aspect, a method of vending articles from a vending machine includes providing articles on a shelf of the vending machine in a substantially upright position and tipping the articles as they reach an end of the shelf proximal a conveyor within the vending machine. The method further includes delivering an article from the shelf to the conveyor, horizontally moving the conveyor to orient the article in a second position substantially perpendicular to the upright position, horizontally transporting the article on the conveyor within the vending machine, and discharging the article from the vending machine in the substantially upright position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Reference will now be made in detail to the present preferred embodiments of the invention, examples of which are illustrated in the accompanying drawings.

Figure 1:
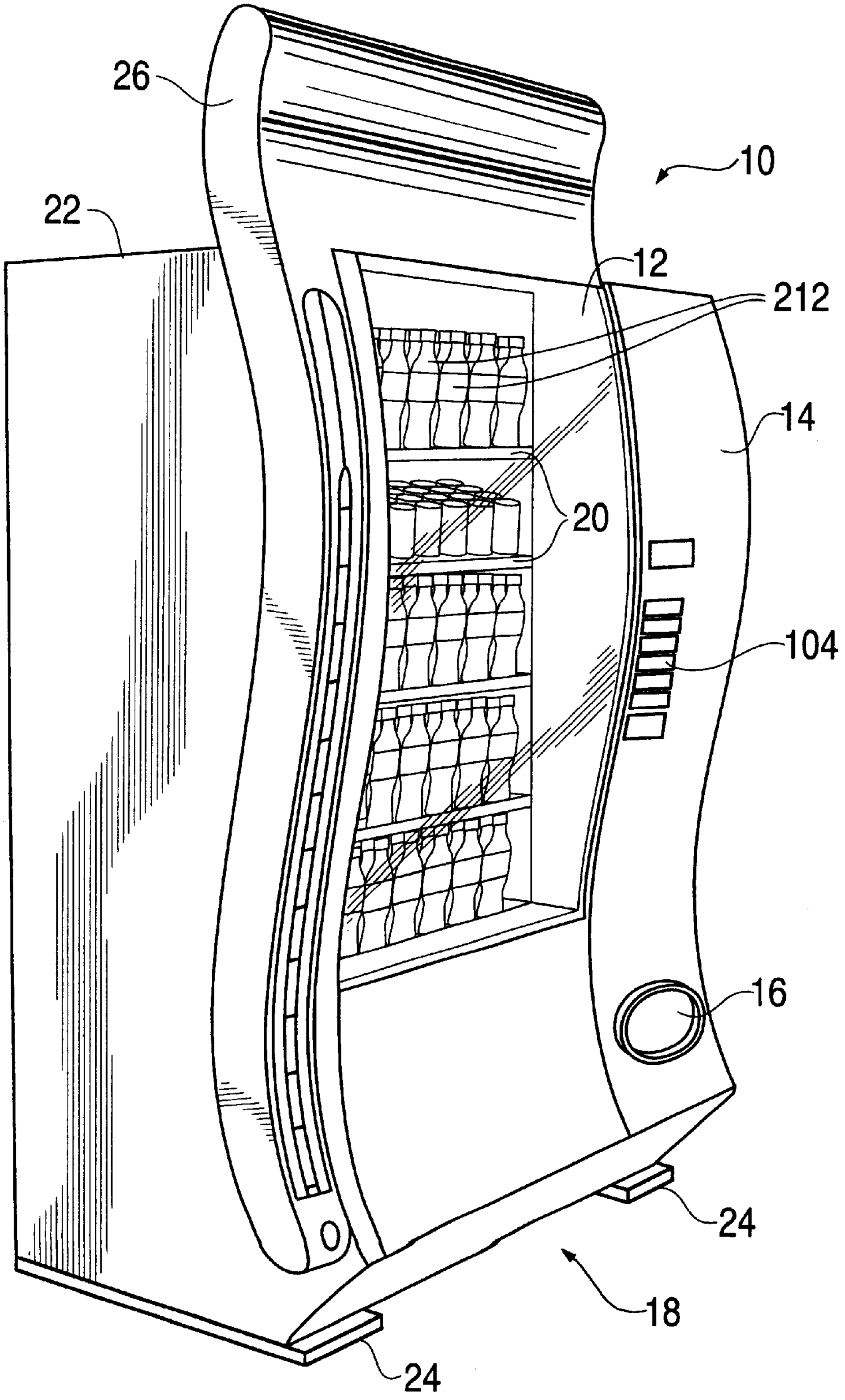
FIG. 1 is a front, perspective view of a vending machine with a curved front face of the present invention.

Referring in detail to the drawings and with particular reference to FIG. 1, a first embodiment of the vending machine 10 of the present invention is shown. This vending machine 10 has a transparent window 12 through which the operation of the vending machine can be viewed. In the disclosed embodiments, the window 12 occupies a majority of the area of the front face of vending machine 10. Of course, the size of this window 12 could be varied. Any suitable material can also be used for this transparent window 12, such as glass or plastic. Moreover, the window can be omitted such that the internal operation of the machine would not be seen. In most situations, however, visibility of the machine's internal operation will draw consumer interest and therefore, increase sales. Accordingly, provision of the window is a good sales technique. Moreover, the window allows ready inspection of the machine such that restocking and maintenance operations are facilitated. While a window 12 is contemplated, the glass or plastic could be omitted such that the face of the machine would be open. However, in most situations, an open front would be unsatisfactory because a barrier is normally needed between the products to be vended and a consumer.

In the first embodiment of the vending machine 10 as shown in FIG. 1, a front face 14 of the vending machine is curved. The window 12 could also be flat or curved independently of or in correspondence with the face of the vending machine 10. As will been seen in later versions, this face can be flat. It should further be appreciated that while a certain curvature is shown in FIG. 1, other curvatures can be used. For example, the convex and concave portions of the front face of the vending machine can be switched or multiple undulations could be provided along the face of the vending machine. Moreover, the face of the vending machine can be curved about a vertical instead of a horizontal axis, if so desired. Many different configurations for the machine face are possible.

In the front face 14 of the vending machine 10, a vend port 16 is provided. While this vend port 16 is shown in a lower right-hand position of the vending machine 10, its location can be changed. As will subsequently be explained, an elevator (not visible in FIG. 1) is provided within the vending machine 10. This elevator could therefore lift the articles to be dispensed from any suitable height for vending. In fact, multiple vend ports could be provided such that the height of the vended item could be based on the height of the user receiving the product. Moreover, depending on type of application, the particular location of the vend port could varied if so desired. Not only could the height of the vend port be varied, but this vend port could be located on the right-hand side (as shown) or the left-hand side or centrally located in the vending machine 10. Thus, it should be appreciated that due to the use of an elevator which is both vertically and horizontally moveable as will be described below, great variety can be had in placing the vend port 16.

The vending machine 10 as shown in FIG. 1 has a curved front face 14, which can be a pivotable door 18. This door 18 would be pivoted to an open position for loading of shelves 20 in the vending machine. For example, in FIG. 1, the door could pivot about a vertical axis at the left-hand corner. In this situation, the entire face of the machine would constitute the door. Alternatively, the panel covering the vend port 16 on the right side of the machine face could be separate from the door and would therefore stay in place when pivoting the door 18. Other door arrangements are possible.

In FIG. 1, five shelves 20 are shown in the vending machine 10. It should be appreciated, however, that any number of shelves can be used. Moreover, any number of rows of items can be provided on the different shelves of the vending machine. It is possible that the heights of the shelves could be varied and that the spacing between shelves could be non-uniform. Because an elevator is used within the vending machine that will be described below, great variety can be had with the positioning of the storage shelves 20. It is contemplated that forty-five facings can be provided due to the number of shelves and rows of items. Thus, many potential varieties or brands of products can be displayed and dispensed from machine 10. This provides many choices for the consumer. Moreover, while beverage containers are contemplated as being vended, it should be appreciated that beverages in cans, bottles, two liter bottles or any other suitable size can be handled by the vending machine 10. In addition, products other than beverages could be dispensed from machine 10.

Behind the face 14 of the vending machine is a vending machine housing 22. The shelves 20 extend into this housing 22. Conventional vending machine components, such as a condenser, can be provided in this housing 22. The housing 22 rests on two feet 24 as shown in FIG. 1. A covering can be provided to hide these feet 24. Rather than using two feet, four feet at each of the corners could also be used or any other suitable arrangement can be used as so desired.

Figure 4:
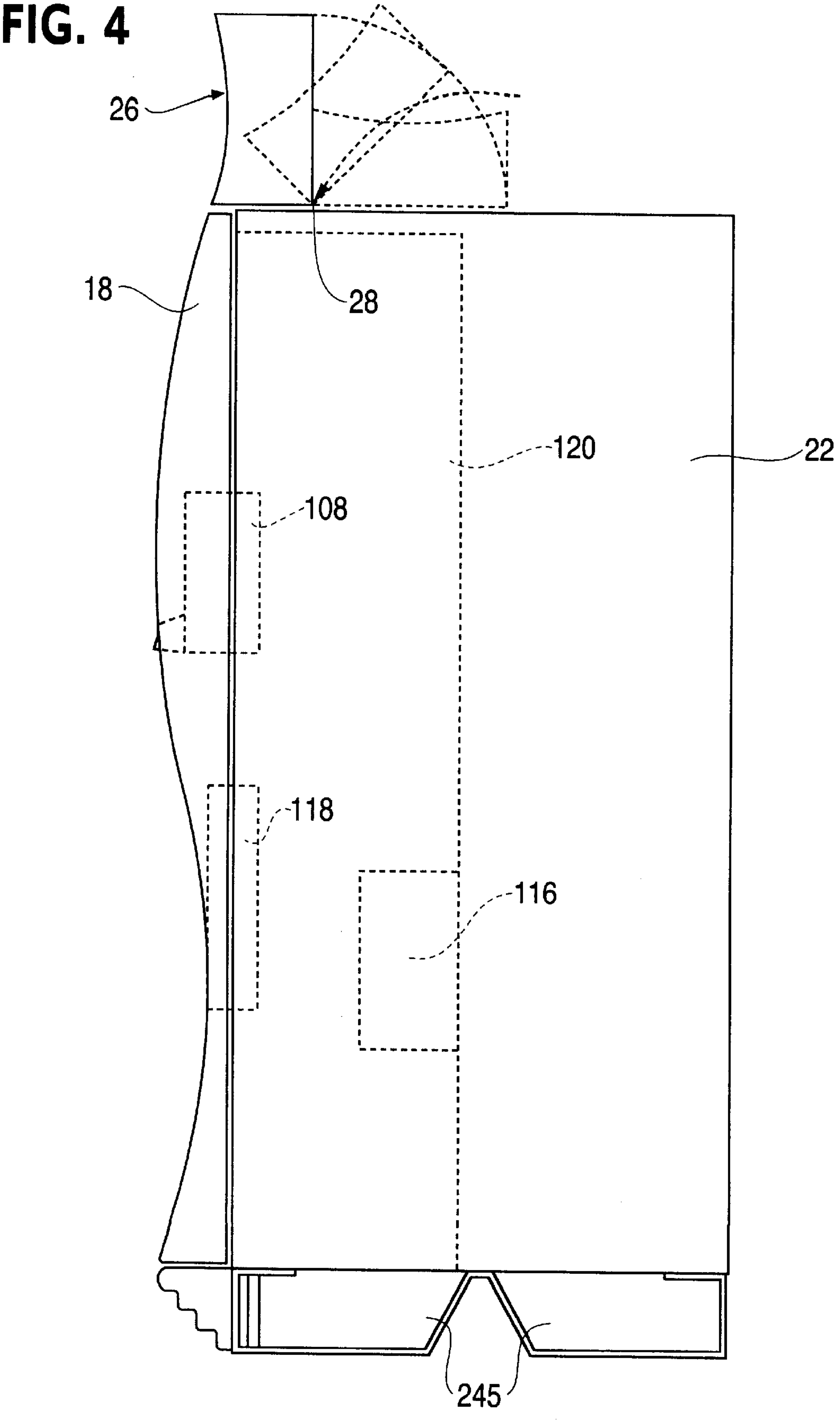
FIG. 4 is a right side view of the vending machine of FIG. 3.

On the top of the pivotable door 18, a side panel 26 is provided as seen in FIGS. 1 and 4. This side panel 26 can be hinged to the vending machine housing 22 about pivot 28 as seen in FIG. 4. Alternatively, this side panel 26 could be hinged to the door 18. As seen in FIGS. 1 and 4, the contour of the side panel can match the contour of the face of the vending machine. Different embodiments of the side panel are seen in FIGS. 1 and 4 with the rear of the side panel is curved in FIG. 1 and the rear of the side panel is straight in FIG. 4. This variation illustrates that different configurations for the side panel are possible.

Figure 2:
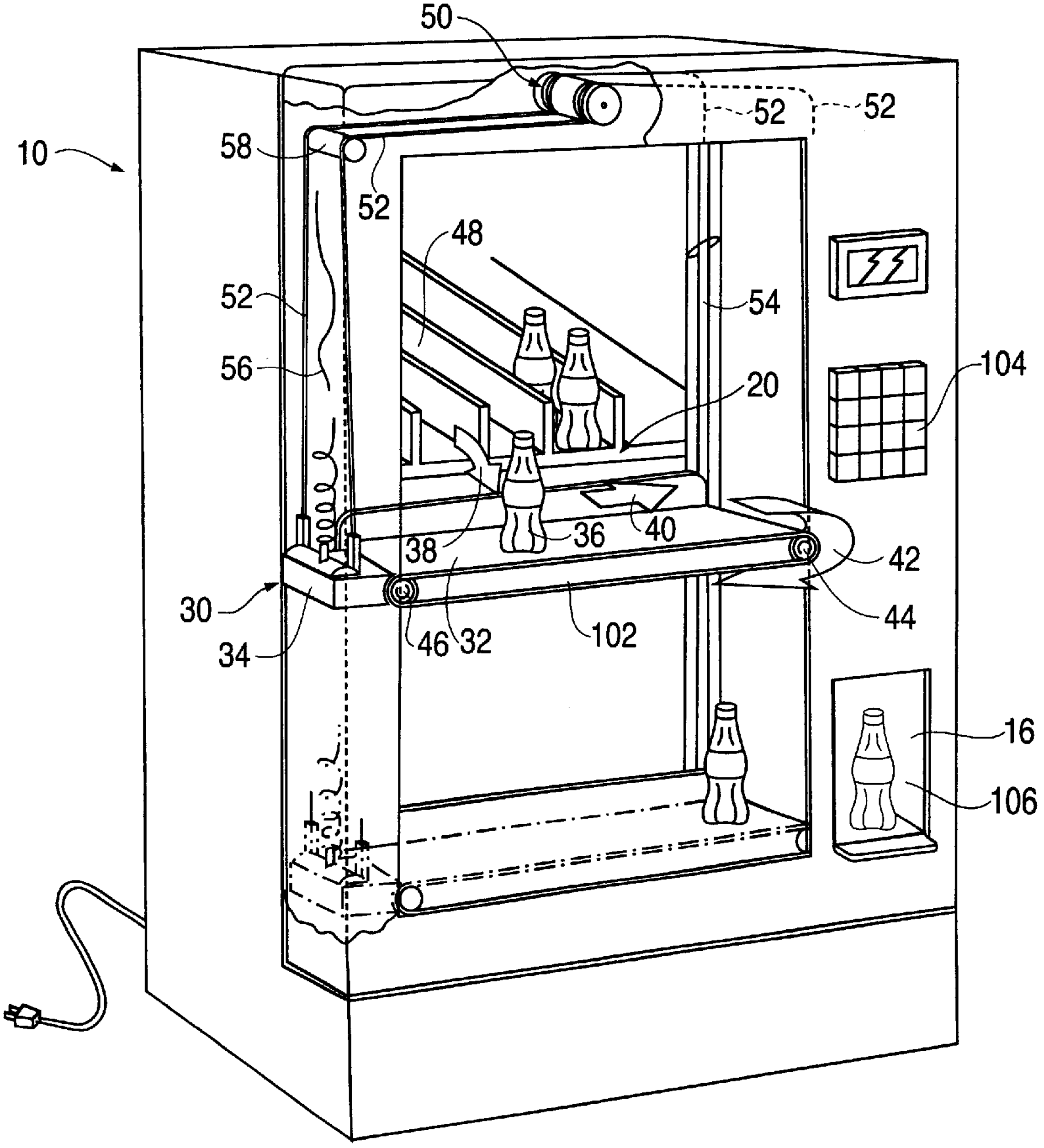
FIG. 2 is a front, perspective, partially cut away view of a vending machine having a flat face and illustrating operation of the elevator and with most shelves omitted for clarity.

Turning now to FIG. 2, operation of the elevator 30 will be described. This elevator 30 is not visible in FIG. 1. Pending U.S. application Ser. No. 09/045,005, filed Mar. 20, 1998 by A. Rudick, P. Carlson and T. Howell discloses a vending machine with an interior elevator. The entire contents (and not just the disclosure of the elevator) of this pending application Ser. No. 09/045,005 are incorporated herein by reference. In FIG. 2, the first embodiment of the elevator 30 includes a horizontal conveyor 32. The elevator 30', which will be described with reference to FIG. 6 instead, uses a tilting elevator bed. The conveyor 32 in FIG. 2 is a belt conveyor. However, a conveyor consisting of a series of links or jointed segments could instead be used. Any known type of conveyor 32 can be used in the vending machine 10 of the present invention. An alternate elevator design will be described hereinbelow with reference to FIGS. 6–10. Also, a series of roller conveyors with a pusher bar, a series of linked cars in a train or a single shuttle car could be used as a conveyor.

A drive 34 is provided for moving this conveyor 32. In FIG. 2, the conveyor 32 moves a selected article 36 horizontally. The top surface of the conveyor 32 is flat and horizontal in order to convey the selected article 36 in an upright position. Of course, this conveyor 32 could be inclined or could be a gravity-feed conveyor. Such a gravity-feed conveyor could not include a roller conveyor. However, when conveying articles 36 such as beverage bottles, an inclined conveyor has a disadvantage in that articles could tip due to their relatively high centers of gravity. It is therefore desirable to use a flat conveyor. As noted above, many different types of conveyors are suitable for use in the vending machine 10 of the present invention.

As indicated by arrow 38, the selected article 36 is discharged from a shelf 20 onto the top surface of conveyor 32. The article 36 is then moved in the direction of arrow 40. The conveyor will wrap around end rollers 44 and 46 as indicated by arrow 42. Thus, an endless conveyor is provided in FIG. 2. Known release mechanisms are provided at the end of each of the shelves 24 releasing a single item to the conveyor 32. Of course with suitable programming, multiple items can be vended simultaneously to the conveyor 32 in order to discharge a plurality of item. However, in normal operation, a single item will be vended for each use of the vending machine 10.

In FIG. 2, only a single shelf 20 is shown for clarity. Of course, a plurality of shelves are contemplated as being used in the machine. Also, in FIG. 2, five rows of items per each shelf 20 are shown. Of course, different numbers of rows can be provided per shelf as discussed above.

In FIG. 2, dividers 48 are shown for separating the different rows of articles. These dividers 48 can also be omitted. The selected article 36 in FIG. 2 is a beverage bottle. The instant invention is also suitable for dispensing beverage cans, juice boxes, large beverage containers, such as two-liter bottles, or any other suitable item. The instant invention is particularly suitable for dispensing elongated items that should remain in their upright position during vending.

A motor 50 is shown in FIG. 2. This motor 50 is connected to the four corners of the elevator 30 by four cables 52. A guide rail 54 is also indicated in FIG. 2 for stabilizing the vertical movement of the elevator 30. While only one guide rail 54 is shown in FIG. 2, it should be realized that a guide rail is provided on the left-hand side of the elevator as well (but is not shown). Of course a single guide rail 54, four guide rails or any other combination of guide rails could be used. Other types of stabilizing devices could be used for aiding in the vertical movement of the elevator 30.

A control wire 56 is shown extending from the drive 34 for the conveyor 32 on elevator 30. This control wire 56 is operatively connected to the controller for the vending machine. As an alternate design, the wire 56 could extend downwardly from the elevator 30. The control signals for the drive 34 can be transmitted through this control wire 56. Due to the coiled nature of the control wire 56, vertical movement of the elevator 30 can be easily accommodated.

A guide roller 58 is shown in the upper left-hand corner of the vending machine 10. The left-hand elevator cables 52 pass over this guide rail 58. Instead, a two guide sheaves or other suitable guide can be provided. The right-hand cables 52 also have such a suitable guide.

While cables 52 are shown extending to each side of the elevator, the provision of suitable guides such as guide rails 54 on the front corners could lend the elevator 30 to only having a single cable 52 or a cable only attached to each side of the elevator 30. Nonetheless, in order to provide a smooth lifting and lowering operation, cables 52 on each side of the elevator are preferred.

In FIG. 2, the selected article 36 is shown being dispensed from the selected row on shelf 20. A guide (not shown) can be provided to aid in the transition from the shelf 20 to the conveyor 32. After loading the conveyor 32 and before the article 36 is moved in the direction of arrow 40, the elevator 30 could be lowered. An alignment device 60 (not shown in FIG. 2) can be used to guide the selected article 36 from the shelf 20 onto the conveyor and then to hold the article during vertical transport of the elevator 30. This alignment device 60 can then be retracted in order to permit horizontal transport of the article 36 in the direction of arrow 40. This operation can occur after lowering of the elevator such that the article will be dispensed directed to the vend port 16. Of course, if this vend port 16 is located in some other position, different movement of the elevator 30 and conveyor 32 are possible. For example, if the vend port 16 were on the left-hand side of the vending machine, then the positioning of the drive 34 could be switched and the conveyor could operate in a direction opposite to that of arrow 40. Also, the article 36 could first be moved in the direction of arrow 40 and then the elevator could be lowered or these operations could occur simultaneously.

Figure 5:
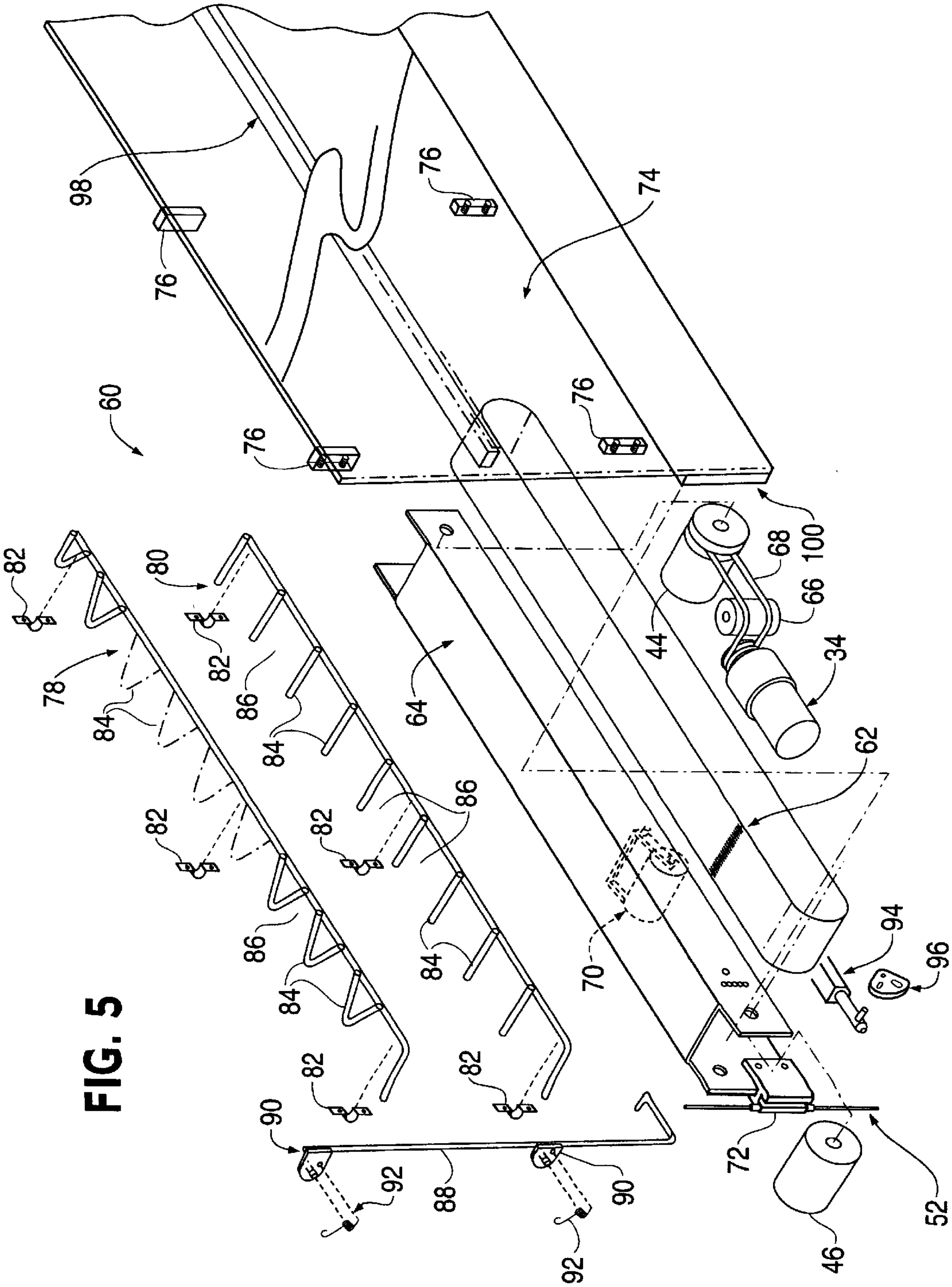
FIG. 5 is an exploded view of an alignment device and conveyor used on the elevator in the vending machine of the present invention.

The alignment device 60 will now be described with reference to FIG. 5. In FIG. 5, an exploded view of the alignment device 60 is shown. The belt 62 of conveyor 32 extends over the elevator bottom frame 64. The drive 34 and end rollers 44, 46 for the conveyor are mounted on this elevator frame 64. In the embodiment of FIG. 5, the conveyor drive 34' is mounted differently from the previously described conveyor drive 34. In particular, the belt 68 connects the motor 34' and roller 44. A vertical roller 66 is provided for guiding this belt 68. The drive 34' and belt 68 can be positioned within the elevator frame 64 in an out-of-the-way position. The previously described control wire 56 can operatively be connected to this conveyor drive 34'.

This alternative mounting for the conveyor drive 34' merely illustrates some different variations possible with the vending machine 10 of the present invention. The elevator drive 34 could also be attached to either end of the elevator frame 64 as noted above.

Within the elevator frame 64, a tension roller 70 is provided. This roller 70 aids in maintaining the belt 62 taunt. The conveyor 32 is moveable relative to the elevator frame 64.

One of the elevator cables 52 is shown in FIG. 5. This cable is attached to the elevator frame 64 by clamp 72. It should be appreciated that the other corners of the frame 64 could also be connected to the cables 52 other arrangements for mounting of the cables 52 are possible as has been described above.

The alignment device 60 includes a panel 74 mounted to the elevator frame 64. This panel 74 in FIG. 5 is transparent. However, only a partially transparent or totally opaque panel 74 could be provided, if so desired.

A plurality of support members 76 are provided on the inner face of the panel 74. The opposite side of the panel 74 faces the transparent window 12 of the vending machine 10.

An upper bar 78 and a lower bar 80 are pivotally mounted to the panel 74. Brackets 82 engage the support member 76 in order to pivotally hold the upper and lower bars 78, 80. Each of the bars 78, 80 have outwardly extending tines 84. In FIG. 5, the upper bar 78 is shown with V-shaped tines, while the lower bar has straight linear tines 84. In FIG. 5, the tines define a plurality of slots 86 therebetween. While nine slots are shown in FIG. 5, it is contemplated that any number of slots could be provided. Each row of articles on shelves 20 should have an associated slot 86. Therefore, when the elevator 30 reaches the desired position, the selected item 36 can move from the shelf 20 onto the conveyor 32. This selected article will be received in one of the slots 86 which corresponds to the shelf from which it was dispensed.

Because the illustrated selected article 36 is a beverage bottle with the upper diameter being smaller than its lower diameter, the V-shaped upper tines 84 help accommodate this change in container shape. Of course, if cylindrical or square items, for example, were being dispensed, then the upper tines 84 could be straight tines similar to the tines 84 on lower bar 80. Any arrangement for the tines 84 is possible.

Both the upper and lower bars 78, 80 are connected to rod 88. The connection 90 for the rod 88 to the bars 78, 80 additionally has a return spring 92. This spring 92 will urge the rod 88 in a downward direction in order to maintain the bars 78, 80 in the position as shown in FIG. 5.

The elevator frame 64 has a solenoid 94 and bell-crank 96 connected thereto. The solenoid 94 is extendable and retractable in order to move the bell-crank 96 to raise and lower the rod 88. Upon activation of the solenoid 94, the rod 88 is moved in order to pivot the bars 78, 80 to raise or lower the tines 84.

It is contemplated that when a selected article 36 is dispensed to one of the slots 86, the tines 84 will help hold this article in its upright position. The elevator 30 then can be moved to the height of the vend port 16. Thereafter, the solenoid 94 can raise the rod 88 and therefore, pivot the tines 84 to an out-of-the-way position. The belt 62 of conveyor 32 is then moved by drive 34 or 34' in order to horizontally transport the selected article 36. Of course, the conveyor 32 could first be activated and then the elevator 30 could be raised or lowered. Moreover, if articles that did not tend to tip over were being handled, then the alignment device 60 could be omitted if so desired. Of course, vending machine 10 could dispense a combination of items, some of which require use of alignment device 60 while others do not.

The brackets 82 and the support members 76 allow the bars 78, 80 to pivot on the panel 74. A bumper 98 is provided on panel 74 in order to cushion engagement between the selected article 36 and the panel 74. This bumper 98 could be omitted if so desired.

Because the panel 74 is transparent, the dispensing operation of the selected article 36 is not obstructed. Operation of the rods 78, 80 and the conveyor 32 is visible by a consumer, therefore increasing interest in the vended product. Of course, this panel 74 does not need to be completely transparent or could instead be opaque, if so desired.

Along the bottom edge 100 of panel 74, a place for indicia 102 can be provided. Such indicia 102 is shown in FIG. 2. The end rollers 44, 46 are not visible through bottom edge 100 due to the frame 64, but could be visible if so desired, for example as shown in FIG. 2. The panel 74 is mounted to the elevator bottom frame 64 and is therefore vertically moveable therewith. The panel 74 is between the conveyor 32 and the face of the vending machine 10. When dispensing a selected article 36, it will first move from shelf 20 towards the window 12 in the vending machine 10. Then the conveyor 32 will move the article in the direction perpendicular to the front face of the vending machine. While it is contemplated that flat shelves 20 will be used, it is possible that a conveyor arrangement can also be used on the shelves.

For example, a power conveyor for each row of articles or roller conveyors could be used if so desired.

Figure 3:
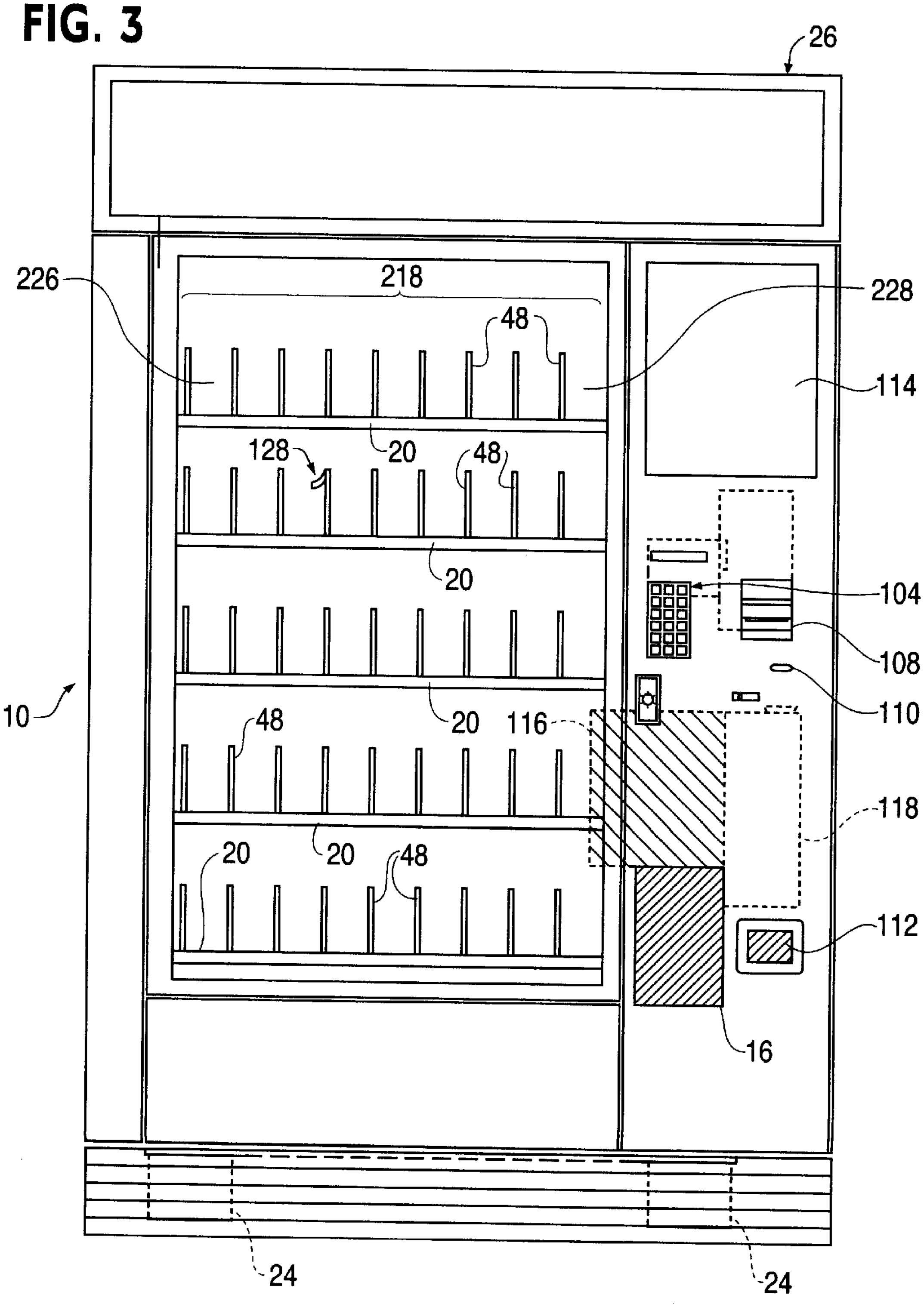
FIG. 3 is a front view of a slightly modified form of the vending machine of FIG. 2.

In FIGS. 1, 2, and 3, different vending machine face arrangements are shown. All of these arrangements have selection buttons 104. In FIG. 1, the vend port 16 is open whereas in FIG. 2, a slidable cover 106 is provided. A bill validator 108, coin slot 110, and coin return 112 are provided in the face of the vending machine of FIG. 3. The coin slot 110 and coin return 112 are used in conjunction with coin mechanism 118. Of course, any of the vending machines can have any combination of these conventional features. In addition, a video display, such as 114 in FIG. 3, could be provided in any of the vending machines. Of course, instead of a video display 114, a conventional light box with an associated graphics panel could be utilized.

In FIGS. 3 and 4, the A.C. distribution box 116 is mounted in the vending machine housing 22 and is schematically shown. The dotted-line section 120 in FIG. 4 represents an interior wall of the vending machine. Other conventional components for a vending machine can be provided in the machine 10 of the present invention.

In operation, a consumer can insert a bill into the bill validator 108 or coins into the coin slot 110. The consumer will then choose an item through selection buttons 104. The subsequent dispensing operation can be viewed through the transparent window 12. The elevator 30 will move to the desired height if not already in position. The selected article 36 will move from the shelf 20 onto the conveyor 32. A suitable ramp or lip can be provided on either the shelf 20 or elevator 30 in order to aid in the transit of the article 36 from the shelf to the elevator 30 as noted above.

If the alignment device 60 is provided, it will aid in maintaining the article 36 in the upright position during vertical transport. This alignment device 60 can then be lifted and the article horizontally conveyed. Alternatively, the alignment device 60 can be moved to an out-of-the-way position and horizontal transport can first occur before vertical transfer occurs or these operations can take place simultaneously. Depending on the item being dispensed, different operations of the vending machine 10 are possible. Moreover, as has been noted above, the alignment device 60 can totally be omitted if so desired.

Nonetheless, to discuss one possible vending operation, the selected article 36 is moved onto conveyor 32. The alignment device 60 will hold it in position while the elevator 30 is lowered or raised to the height of the vend port 16. The solenoid 94 will then pivot the bars, 78, 80 in order to raise tines 84. Thereafter, the conveyor 32 can be activated in order to move the selected article 36 to the vend port 16. The consumer can view this entire operation in order to thereby increase interest in the vending operation. With increased interest, increased sales should result.

During this raising and lowering of the elevator 30, it is linearly moved adjacent to the transparent window 12. The bottom member frame 64 of the elevator 30 extends in a longitudinal direction that is generally parallel to the transparent window 12. Basically, the elevator 30 moves in a first direction while the conveyor 32 moves in a second, perpendicular direction.

Figure 6:
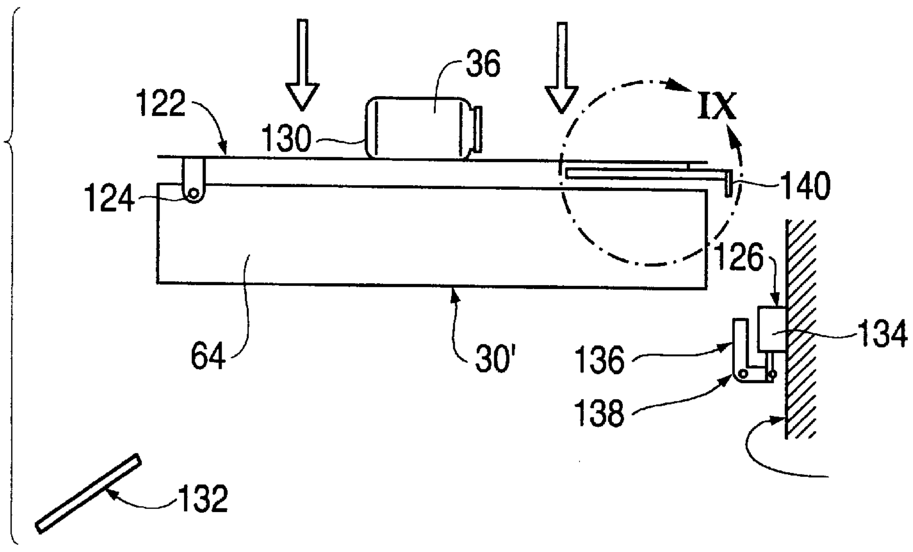
FIG. 6 is a modified form of the elevator used in the vending machine of the present invention.

Turning now to the embodiment of FIG. 6, a modified form of the elevator 30' is shown. Instead of using the above-described conveyor 32 on the elevator, a simpler design is utilized. In particular, a tiltable elevator bed 122 is provided on the frame 64 of vertically movable elevator 30'. This type of slide and dump elevator 30' as will be described hereinbelow can be used with the vending machine described in the above-identified U.S. patent application Ser. No. 09/045,005. In fact the previously described elevator 30 with conveyor 32 could be used in the vending machine of U.S. patent application Ser. No. 09/045,005.

In the modified form of the elevator 30', the elevator bed 122 is pivotable about point 124. An actuation device 126 is provided on the wall of elevator shaft adjacent the path of the elevator 30'. In the FIG. 6 arrangement, the pivot point 124 is shown on the left-hand side of the elevator. As should be appreciated, the pivot point 124 could instead be on the right-hand side of the elevator shaft with the actuation means device 126 being on the left-hand wall. Other arrangements for the activation device 126 will become apparent in view of the description to follow.

A selected article 36 is provided on the elevator bed 122 in FIG. 6. This article has simply been dispensed from the shelves 20 of the vending machine 10. In FIG. 3, a single tilt rail 128 is shown at the end of one of the dividers 48. It should be appreciated that each divider 48 could have such a downwardly and leftward slopping tilt rail 128 (as shown in FIG. 3). These 128 rails work such that upon dispensing of a selected article 36 from a row on shelf 20, the top of the article will be laid down onto the elevator bed 122. The ends of the tilt rails 128 do not extend into the path of the elevator 30' such that they will not interfere with moving of the elevator 30'. Because the right and left dividers 48 for each rail would have such a rail 128, the article can be securely guided into its tilted position. As noted above, only a single tilt rail 128 is shown in FIG. 3 for simplicity. However, each of the dividers 48 could have such a rail. Moreover, instead of being a separate element from the rail, the ends of the dividers 48 themselves could be bent such that their full length or only a partial height thereof would be utilized in tilting the articles from the vertical to a horizontal orientation.

Due to the downward and leftward slope of the tilt rail 128 shown in FIG. 3, the top of the selected article 36 would face the right-hand portion of the vending machine. In FIG. 6, an opposite arrangement is shown. This arrangement of FIG. 6 is contemplated as having a discharge port 16 adjacent the left-hand portion of the elevator shaft. However, in the FIG. 3 embodiment, the discharge port would be adjacent the right-hand portion of the elevator shaft such that the selected article 36 would be tilted to have its bottom 130 facing the vend port 16. As will be explained, this orientation can result in dispensing of an upstanding article or at least dispensing of an article having its top above its bottom 130. Therefore, it should be appreciated in the FIG. 6 arrangement that if the vend port where actually on the right-hand side of the shaft, then the pivot point 124 for the elevator bed 122 would be located on the right-hand side of the elevator 30'. Also, the tilt rails 128 would tilt the articles such that the bottom 130 would face the right-hand side of the elevator 30'. If elongated articles such as beverage cans or bottles are not dispensed, but instead articles with relatively low centers of gravity were dispensed, then the tilting of the article by the tilt rails could be omitted. The article would just simply slide from one of the rows on shelves 20 onto to the elevator 122 and then slide on the elevator bed 122 to a chute 132. Thus, the elevator bed 122 acts as a conveyor or slide.

In FIG. 6, the fixed chute 132 will now be described. This chute 132 is provided adjacent the elevator path and leads to the vend port 16. Anti-pilfer devices can be provided between the vend port 16 and this chute 132, if so desired.

The actuation device 126 is mounted on the wall of the shaft area of the vending machine opposite chute 132. This actuation device 126 includes solenoid 134 operatively connected to actuation lever 136. This lever 136 is pivotable about point 138.

Figure 7:
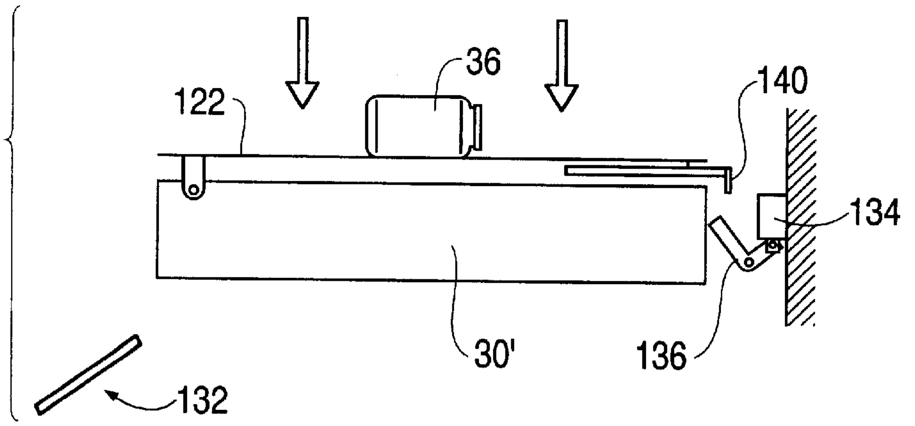
FIG. 7 is a view of the modified elevator of FIG. 6 prior to tilting of the elevator bed.
Figure 8:
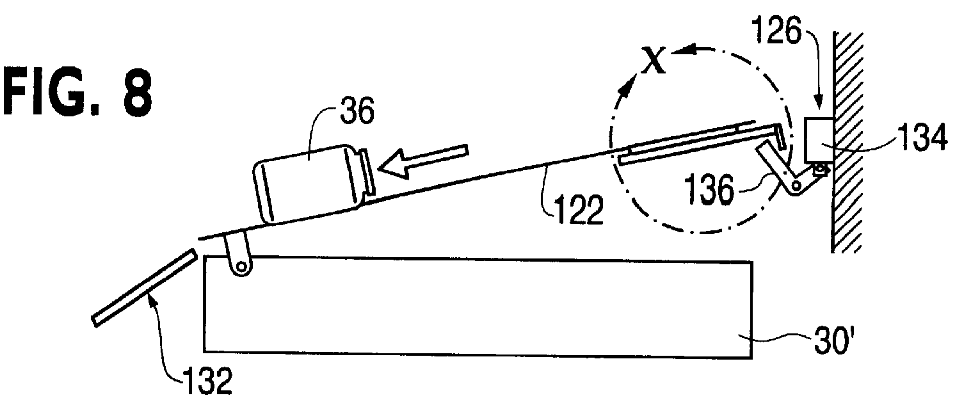
FIG. 8 is a view of the modified elevator of FIG. 6 showing the elevator bed in a tilted position.

Upon actuation of solenoid 134, the lever 136 will move from its inoperative position shown in FIG. 6 to the operative position shown in FIG. 7. In this actuated position, the lever 136 extends into the path of the elevator 30'. A catch 140 is provided at the end of elevator bed 122. This catch 140 will be engaged by the actuation lever 136 in order to lift the elevator bed 122 to a raised position as shown in FIG. 8. The actuation device 126 is fixed on the wall of the vending machine or to the shaft. Lifting of the bed 122 occurs after engagement with lever 136 and continued downward movement of the elevator 30' as will be described below. In the FIG. 8 position, the selected article 36 will slide from the elevator bed 122 onto chute 132. From the chute 132, the article will be available at the vend port 16 of vending machine 10.

Figure 9:
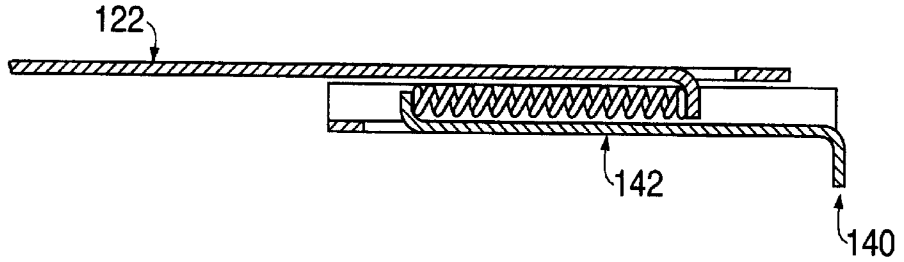
FIG. 9 is an enlarged view of the tilt actuator of the modified elevator prior to activation taken from encircled area IX of FIG. 6.
Figure 10:
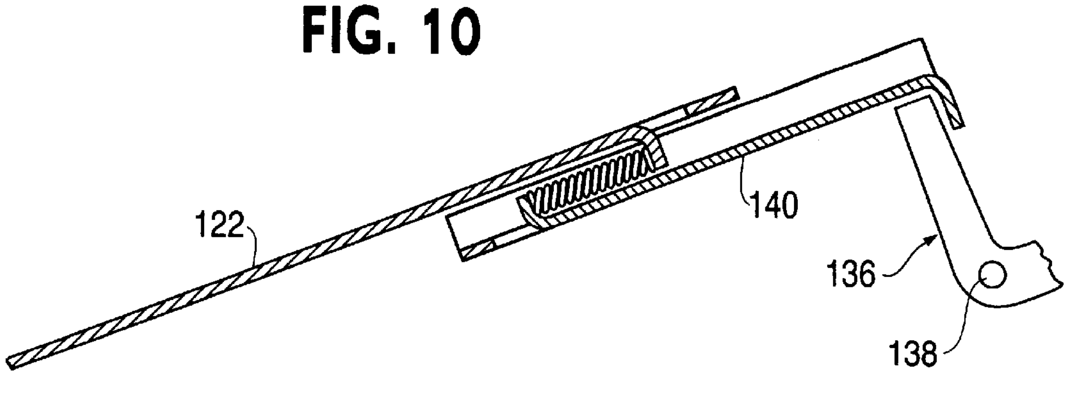
FIG. 10 is an enlarged view of the activated tilt actuator of the modified elevator taken from encircled area X of FIG. 6.

The catch 140 is better shown in FIGS. 9 and 10. This catch 140 is spring loaded by spring 142 to normally be in its retracted position as shown in FIG. 9. However, when engaged by the actuated lever 136, the catch 140 will be moved to the extended position as shown in FIG. 10 thereby compressing spring 142. Of course, this spring arrangement could be modified to instead use a tension spring. Extension of the lever 142 and subsequent tilting of the bed 122 is carried out by the elevator 30' moving in a downward direction. In particular, when the lever 136 is actuated to move into the path of the elevator, the catch 140 will be engaged by this lever 136 as the elevator 30' moves downwardly. Continued downward movement of the elevator 30' causes the catch 140 to extend and causes compression of spring 142. This downward movement will also cause the elevator bed 122 to pivot about point 124. As noted above, this action will cause the selected article 136 to slide from the elevator bed 122 onto chute 132.

It is contemplated that the elevator bed 122 can simply be a flat surface but a groove or V-shape could be used to center the article 36. For example, a metal sheet or wooden platform can be used. Of course, this elevator bed 122 can be coated with material in order to aid sliding of the article 36. In fact, rollers or other non-powered conveyor means could be used on the tiltable elevator bed 122. In addition, a powered conveyor arrangement similar to the first embodiment could be used on this elevator bed 122 if so desired.

The modified elevator 30' of FIGS. 6–8 has an advantage over the powered conveyor 32 used on the elevator 30 of the first embodiment. In particular, this elevator 30' with tiltable elevator bed 122 is less expensive to manufacture and maintain.

It should be noted that when the actuation device 126 is in the neutral or non-activated position of FIG. 6, the elevator 30' is free to travel along the elevator path. The catch 140 will not interact with this actuation device 126 until it moves to the position of FIG. 7. The location of the actuation device 126 and chute 132 could be varied such that the vend port 16 would be located at any suitable height of the vending machine. For example, if the vend port 16 were near the top of the vending machine, it would be possible for the elevator 30' to move downwardly passed the unactuated device 126. The elevator would then receive the selected article 136 from a shelf 20 and move upwardly passed the actuation device 126. After the elevator has reached this position, it would then return to a downward movement after or during pivoting of the lever 136 to the FIG. 7 position. Continued downward movement of the elevator 30' would cause the catch 140 to be engaged with the lever 136 for subsequent dispensing of the article 36 to chute 132. Of course, if the vend port 16 were located towards the bottom of the vending machine, it may be necessary to have the elevator 30' first receive a product and then move upwardly to a position above the actuation device 126. Rather, the elevator 30' could move to a suitable location to receive an article from one of the shelves 20. Then the elevator would simply move downwardly in order to engage the actuated lever 136 for subsequent discharge of article 36 to chute 132. Either way, it is possible to have many different designs for the location of vend port 16.

After the selected article 36 has been dispensed to chute 132, the elevator 30' can move upwardly from its position in FIG. 8. This will disengage the catch 140 from the actuation device 126. The solenoid 134 can return the actuation lever 136 to its inoperative position of FIG. 6. Alternatively, rather than using a powered solenoid arrangement, a return spring or other arrangement could be used for pivoting this lever 136 back to its inoperative position. As the elevator 30' moves upwardly to disengage the catch 140 from the lever 136, the bed 122 will pivot in a clockwise direction about point 124 in order to return to its horizontal orientation. When the catch 140 and lever 136 are disengaged from one another, the spring 142 will return the catch 140 to its retracted position as shown in FIG. 9. Of course, rather than using a spring 142, other arrangements are possible for returning this catch 140 to its inoperative position.

Until the actuation device 126 is again turned on to move lever 136 into the path of movement of the elevator 30', the elevator 30' is free to move upwardly and downwardly passed this actuation device 126 without subsequent tilting of the elevator bed 122. However, when it is desired to dispense an article, then the actuation device 126 can again be activated Another exemplary embodiment of the vending machine of the present invention is shown in FIGS. 11–16. As embodied herein and referring to FIGS. 3, 11, 12, and 14, the vending machine 10 includes a shelf 220 and a conveyor 232. The conveyor 232 may include an endless belt mounted around two opposed rollers, similar to that described above. The shelf 220 supports one or more articles 212 that may be selectively vended from the machine 10. The articles 212 may be, for example, bottles, cans, boxes, or pouches containing a beverage. The shelf 220 supports the articles 212 in an upright orientation, such that the bottom 214 of an article rests on the shelf 220 and the top 216 of the article extends away from the shelf 220.

Figure 11:
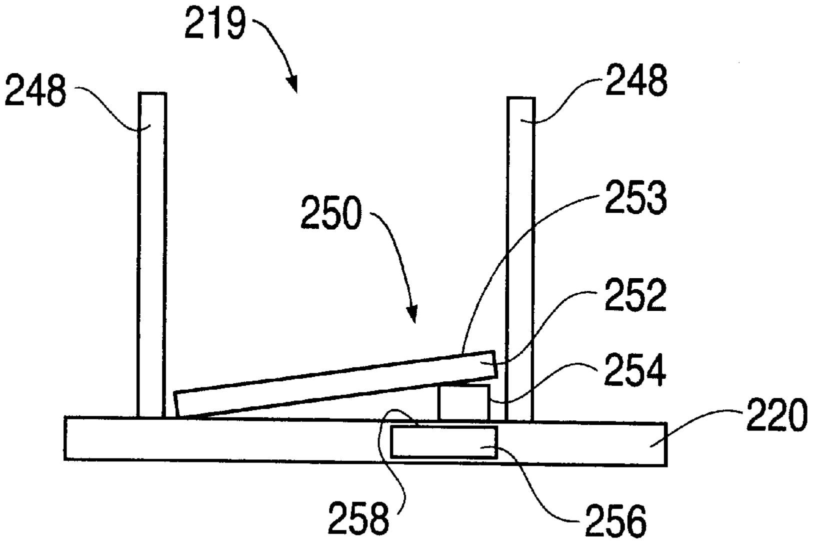
FIG. 11 is a front view of a tipping mechanism used for a row of a shelf in the vending machine of the invention.
Figure 12:
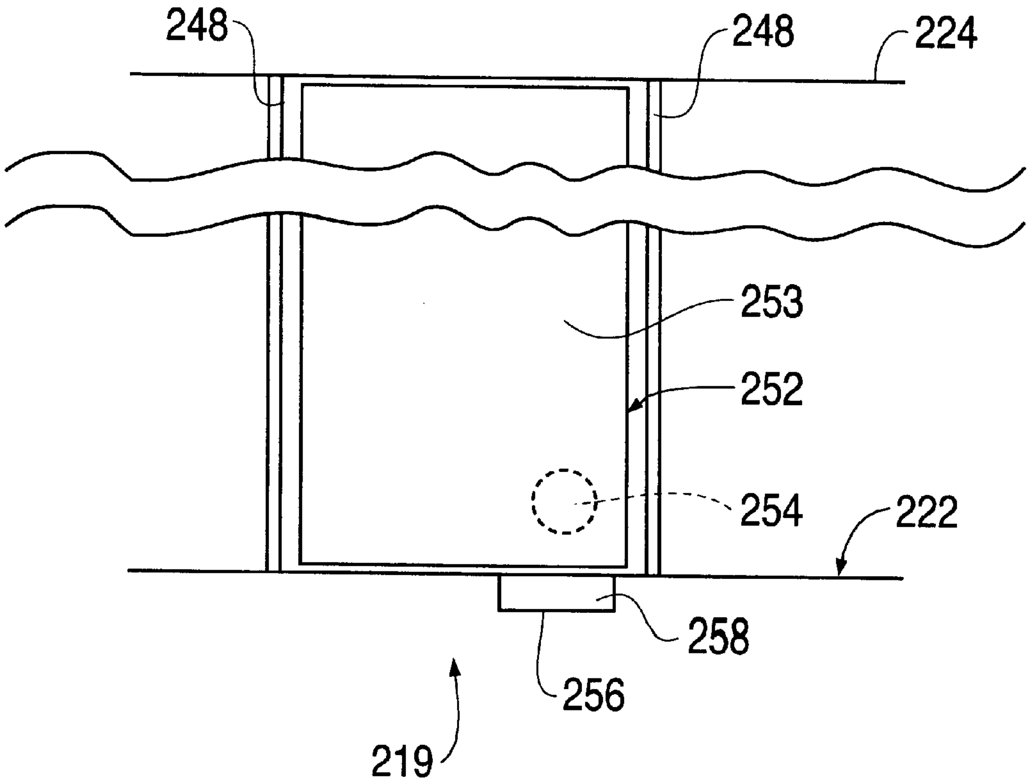
FIG. 12 is a top view of the tipping mechanism and shelf shown in FIG. 11.

The articles 212 are typically aligned in one or more rows 218 extending from the front end 222 of the shelf to the rear end 224 of the shelf, the front of the shelf being the end nearest the conveyor 232 The rows of articles may be separated by dividers 248 to help maintain the alignment of the articles. For purposes of clarity, FIGS. 11 and 12 illustrate only one of the rows of articles on the shelf. The features shown in FIGS. 11 and 12 could be implemented in each row, if desired, and with the modifications described below for the left-most and right-most rows 226, 228.

The articles may be delivered from the shelf 220 to the conveyor 232 by any known method, as described above. For example, in one embodiment, the shelf 220 slopes downward at an angle of approximately 10° from the rear end 224 to the front end 222 to effect a gravity feed of the articles from the shelf 220 toward the conveyor 232. In addition or alternatively, a gating system (not shown) may be employed with or without a spring-biased pusher to deliver articles from the shelf 220 to the conveyor 232.

The vending machine 10 also includes a tipping mechanism 250 for a row 219 of articles. As illustrated in FIGS. 11 and 12, the tipping mechanism 250 includes a ramp 252 that extends from the front 222 of the shelf to the rear 224 of the shelf and a spacer 254 between the shelf 220 and the ramp 252. The spacer 254 is positioned at the front end 222 of the shelf and toward the right side of the row 219. At the rear end 224 of the shelf, the ramp 252 rests generally flat on the shelf 220; while at the front end 222 of the shelf, the ramp 252 angles upward from the shelf 220, with the right side of the ramp supported by the spacer 254. Thus, the ramp slopes gently upward from the rear end 224 of the shelf to the front 222 and from the left side of the row 219 to the right. As a result, the tops 216 of the articles nearer to the front end 222 of the shelf tip toward the left, and the articles supported at the rear 224 of the shelf are oriented more upright that those supported toward the front.

Figure 13:
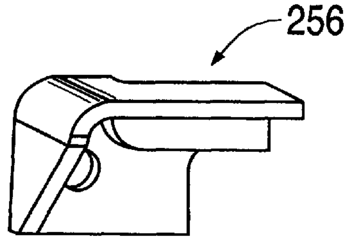
FIG. 13 is a perspective view of a product rotator used for tipping mechanism shown in FIG. 11.

The tipping mechanism 250 may also include a product rotator 256 extending from the shelf 220. The product rotator 256 is positioned toward the right side of the row 219 of articles. A top surface 258 of the product rotator 256 is substantially aligned with a top surface 221 of the shelf 220. In an embodiment where the shelf 220 slopes downward from the rear 224 to the front 222, the product rotator 256 is positioned at a vertical height below that of the ramp 252, but the top surface 258 of the product rotator 256 is aligned with the top surface 253 of the ramp 252, as illustrated in FIG. 11. The product rotator 256 maintains or increases the tipped orientation of an article being delivered from the shelf 220 to the conveyor 232. The product rotator 256 may extend from the shelf 220 to any point that does not interfere with the operation of the conveyor 232. The product rotator 256 may, for example, be an L-shaped flange, as shown in FIG. 13. The rounded corner of the flange shown in FIG. 13 assists with tipping the article.

In operation, the shelf supports one or more rows 218 of articles 212. The articles toward the front 222 of the shelf are tilted toward the left as a result of the tipping mechanism 250. In particular, the spacer 254 causes a front corner of the ramp 252 to be elevated from the shelf 220. An article is selectively delivered from the shelf 220 to the conveyor 232 in accordance with a selection request input by a consumer.

As the article exits the shelf 220, the right portion of the bottom 214 of the article contacts the product rotator 256, causing the article to tip further toward the left. The article continues tipping until is reaches the conveyor 232. Eventually, the article attains a lateral orientation substantially perpendicular to the original, upright orientation.

In a preferred embodiment, the conveyor 232 is driven substantially simultaneously with the delivery of the article from the shelf 220 to the conveyor 232. The conveyor 232 is driven in a direction opposite to the tipping direction of the article. For example, as the top 216 of the article tips toward the left, the conveyor 232 is driven from left to right. As the bottom 214 of the tipping article comes in contact with the conveyor 232, the conveyor 232 contributes to the tipping motion of the article, thereby assisting the article to attain the lateral orientation.

With the article in the lateral orientation and the bottom 214 of the article facing in a direction of the vend port 16, the conveyor 232 transports the article horizontally toward the vend port 16. As the bottom 214 of the article over the roller nearest to the vend port 16, the bottom 214 begins to tip downward and the top 216 begins to tip upward until the article attains the substantially upright orientation and arrives at the vend port 16.

It should be appreciated that in order to facilitate the re-orientation of the article to the substantially upright orientation and delivery of the substantially upright article to the vend port 16, the conveyor 232 must be positioned at a horizontal level at least toward the top of the vend port 16. Also, the region of the vending machine between the conveyor 232 and the vend port is configured so as not to impede the reorientation of the article to the substantially upright position.

As can be seen from FIG. 3, the left-most and right-most rows 226, 228 of articles are positioned proximal to the left- and right-side walls 206, 208 of the vending compartment. These side walls 206, 208 may affect the operation of the invention, described above, for the left- and right-most rows 226, 228 of articles. Thus, the tipping mechanisms for these rows are modified so that the articles can be tipped as they are delivered from the shelf 220 to the conveyor 232, without interference from the side walls 206, 208, and eventually attain a lateral orientation.

Figure 14:
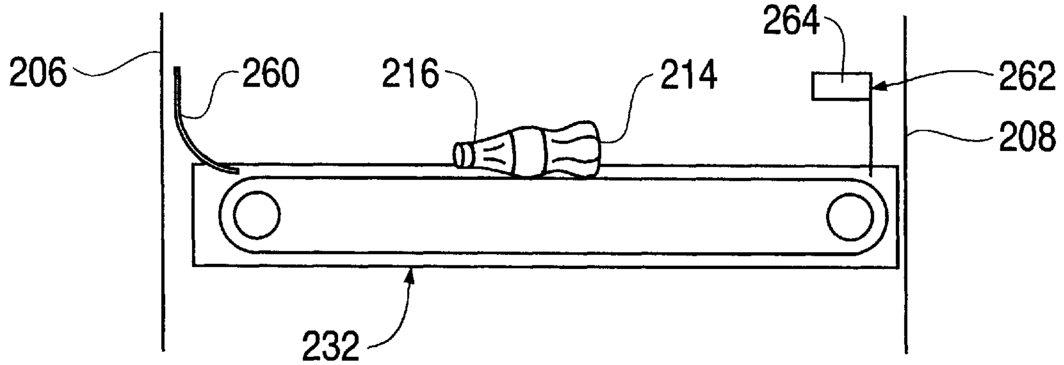
FIG. 14 is a front view of the conveyor used for the tipping mechanism of FIG. 11.
Figure 15:
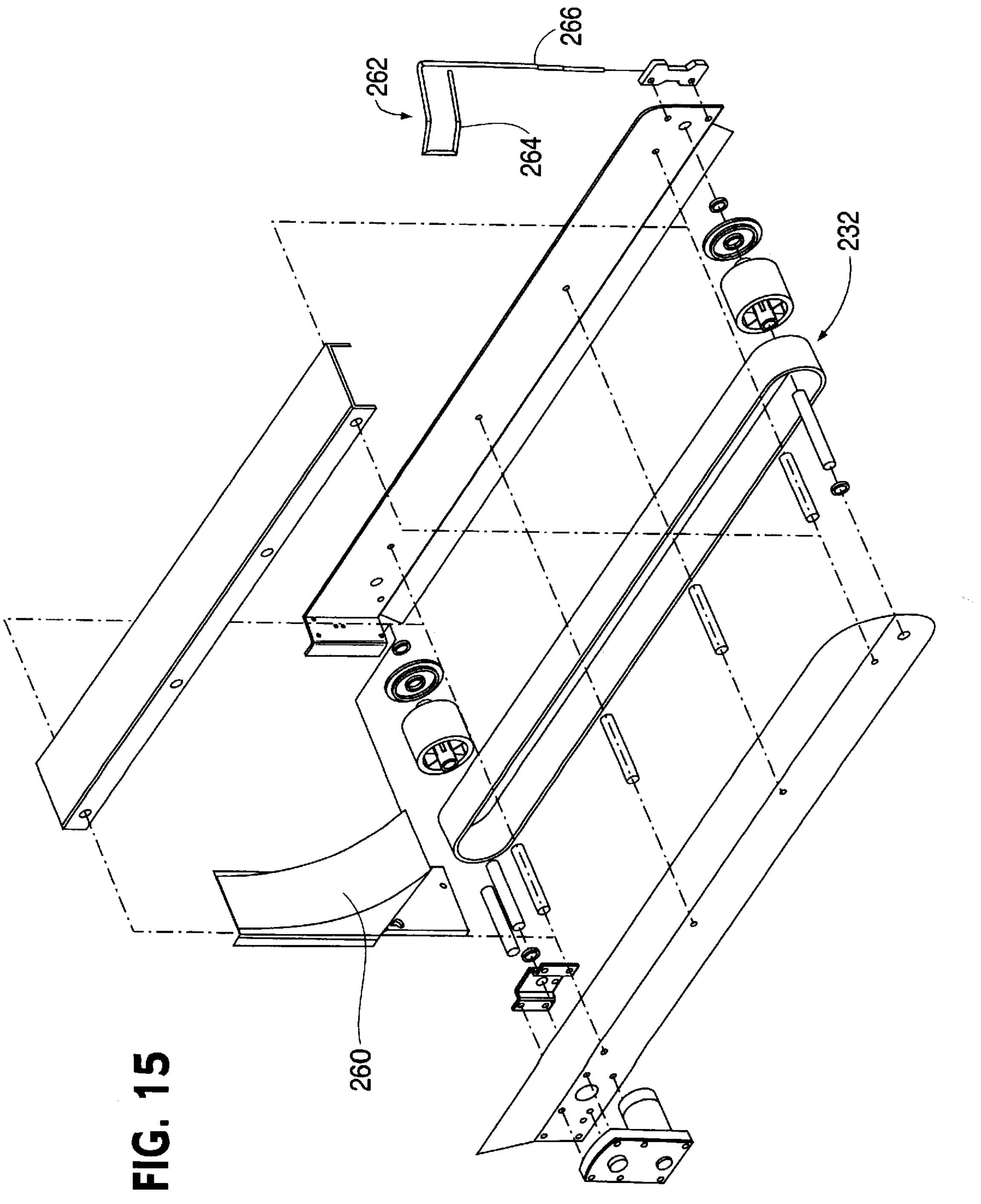
FIG. 15 is an exploded view of one embodiment of the conveyor of FIG. 14.

As shown in FIGS. 14 and 15, the left end 234 of the conveyor 232 includes a slide 260. The slide 260 is positioned on the conveyor 232 to align toward the left side of the left-most row 226 of articles, while not impeding progress of an article from the shelf 220 to the conveyor 232. As the article is delivered from the shelf 220 to the conveyor 232, the slide 260 assists the bottom 214 of the article in moving toward the right, thus allowing the top 216 of the article to continue tipping toward the left. Also, the left-most row does not includes a product rotator, since the product rotator would hinder the rightward movement of the bottom 214 of the article as it is delivered from the shelf 220 to the conveyor 232.

Figure 16:
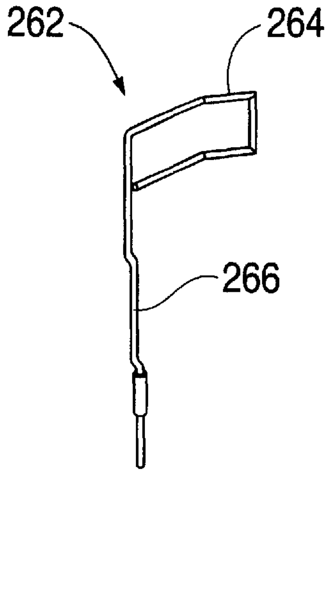
FIG. 16 is a perspective view of one embodiment of the tip arm mounted on the conveyor of FIG. 14.

Also illustrated in FIG. 14, the right end 236 of the conveyor includes a tip arm 262. The tip arm 262 is positioned on the conveyor 232 to align toward the right side of the right-most row 228 of articles while not impeding progress of an article from the shelf 220 to the conveyor 232. As the article is delivered from the shelf 220 to the conveyor 232, the tip arm 262 contacts an upper portion of the article, causing the top 216 of the article to continue tipping toward the left. As shown in FIGS. 15 and 16, the tip arm 262 may include an angled flag portion 264 for contacting the article and a jogged post 266 to provide clearance for the article delivered to the conveyor 232.

In one embodiment, the vending machine includes a plurality of shelves, each shelf having a plurality of rows of articles to be vended. In this embodiment, the conveyor is mounted on an elevator, similar to that described above. The elevator moves the conveyor, and any article on the conveyor, in a vertical direction between the shelves and the discharge port. Preferably, the conveyor is not driven while the elevator moves vertically. Alternatively, a conveyor carrying an article could be driven while the elevator moves as long as a sensor or other mechanism is employed to ensure that the article does not prematurely leave the conveyor.

It should be appreciated that a tiltable elevator, similar to that described above with respect to FIGS. 6–10, may also be employed to deliver a laterally-oriented article to the discharge port. In this situation, the elevator may or may not include the conveyor 232 for assisting with the tipping of articles from the substantially upright orientation to the lateral orientation.

It should also be appreciated the vending machine may include the vend port on a left-hand side, i.e., opposite that shown in FIGS. 1–3. As a result, the features and operation as described with respect to FIGS. 11–14 would simply need to be reversed. For example, the spacer and product rotator would be positioned toward the left side of the row, the slide would be on the right end of the conveyor and the tip arm would be on the left, and the tops of the articles would tip toward the right as they approach the front end of the shelf 220 and are delivered to the conveyor.

Yet further, it should be appreciated that the shelf 220 may include a corrugated, finned, or knurled surface in order to reduce the surface area of the shelf in contact with the bottom 214 of an article.

Anti-pilfer devices can be provided in the area of the vend port 16 of all embodiments. Such anti-pilfer devices are conventional in the art. Morecver, the vending machine of the present invention is readily portable.

Accordingly, the present invention provides a vending machine 10 that can increase consumer's interest in the vended products and therefore, increase sales. Great flexibility is had with the vending machine 10 due to the provision of the elevator 30 and conveyor 32 or tiltable elevator bed 122. The vend port 16 can be located in many different locations thereby varying the look and operation of the vending machine 10. When using the conveyor 32 arrangement along with the alignment device 60, if so desired, the vending machine can aid in maintaining dispensed products in a desired vertical orientation. Therefore, elongated articles can be maintained in their upright position during dispensing. The instant invention therefore provides a method and apparatus for dispensing articles, which will provide an attractive display for generating consumer interest in the vended product.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

We claim:

1. A vending machine comprising:

at least one shelf for supporting articles to be vended and presenting the articles for delivery;

a tipping mechanism positioned at a first end of the at least one shelf, the tipping mechanism modifying an orientation of an article being delivered from the at least one shelf;

a substantially horizontal conveyor positioned adjacent the first end of the at least one shelf, the conveyor receiving the article delivered from the at least one shelf; and a vend port for receiving the article from the conveyor and accommodating discharge of the article from the vending machine.

2. The vending machine as recited in claim 1, wherein the vend port is provided in a front face of the vending machine and wherein movement of a selected article from the at least one shelf to the conveyor is in a direction toward the front face of the vending machine.

3. The vending machine as recited in claim 1, further comprising a transparent window in a front face of the vending machine, articles on the at least one shelf and the conveyor being visible through the window.

4. The vending machine as recited in claim 3, wherein the front face of the vending machine is flat or curved.

5. The vending machine as recited in claim 1, wherein the at least one shelf includes at least one row of articles and wherein the tipping mechanism includes a ramp extending substantially over a length of the at least one row.

6. The vending machine as recited in claim 5, wherein the tipping mechanism further includes a spacer positioned between the at least one shelf and the ramp and adjacent an end of the at least one shelf where the article is delivered to the conveyor.

7. The vending machine as recited in claim 6, wherein the tipping mechanism further includes a product rotator extending from the at least one shelf and aligned with a top surface of the ramp.

8. The vending machine as recited in claim 7, wherein the at least one shelf holds articles in a substantially-upright, first orientation and the conveyor transports the article in a second orientation, the second orientation being substantially perpendicular to the first orientation, and wherein the ramp modifies the orientation of the article to an intermediate orientation between the first orientation and the second orientation and the product rotator continues modification of the orientation of the article from the intermediate orientation toward the second orientation.

9. The vending machine as recited in claim 8, wherein movement of the conveyor modifies the orientation of the article to the second orientation.

10. The vending machine as recited in claim 1, wherein the at least one shelf supports articles in a substantially-upright, first orientation and the conveyor transports the article in a second orientation, the second orientation being substantially perpendicular to the first orientation.

11. The vending machine as recited in claim 10, wherein the tipping mechanism modifies the orientation of the article to an intermediate orientation between the first orientation and the second orientation.

12. The vending machine as recited in claim 11, wherein the conveyor receives the article in the intermediate orientation and movement of the conveyor modifies the orientation of the article from the intermediate orientation to the second orientation.

13. The vending machine as recited in claim 12, wherein the vend port accommodates discharge of the article in the first orientation.

14. The vending machine as recited in claim 13, wherein the conveyor is a pivotable elevator bed.

15. The vending machine as recited in claim 13, wherein, while in the second orientation, a bottom of the article faces in a direction of the vend port.

16. The vending machine as recited in claim 15, wherein the conveyor includes an endless belt mounted around two opposed rollers, wherein the conveyor transports the article in a direction toward the vend port, and wherein the orientation of the article is modified from the second orientation toward the first orientation as the bottom of the article passes the roller nearest the vend port.

17. The vending machine as recited in claim 1, further comprising an elevator vertically movable relative to the at least one shelf, the conveyor being mounted on and movable with the elevator.

18. The vending machine as recited in claim 17, further comprising a face of the elevator having indicia provided thereon, the face of the elevator being vertically movable with the elevator.

19. The vending machine as recited in claim 17, wherein the conveyor on the elevator is a powered conveyor.

20. The vending machine as recited in claim 19, wherein a drive for the conveyor is mounted on the elevator.

21. The vending machine as recited in claim 17, further comprising a transparent window in a front face of the vending machine, and wherein the at least one shelf further comprises a plurality of shelves, each of the shelves being accessible by the elevator, and articles on each of the shelves and the conveyor being visible through the window.

22. The vending machine as recited in claim 21, wherein the elevator and the conveyor move the at least one selected article in a direction perpendicular to the front face of the vending machine.

23. The vending machine as recited in claim 1, wherein the at least one shelf includes a plurality of rows of articles, and wherein each row includes a ramp extending substantially over a length of the respective row and a spacer positioned between the at least one shelf and the ramp and adjacent an end of the at least one shelf where the article is delivered to the conveyor.

24. The vending machine as recited in claim 23, wherein the at least one shelf holds articles in a substantially-upright, first orientation and the conveyor transports the article in a second orientation, the second orientation being substantially perpendicular to the first orientation, and wherein the ramp modifies the orientation of the article to an intermediate orientation between the first orientation and the second orientation.

25. The vending machine as recited in claim 24, further comprising at least one product rotator extending from the at least one shelf and aligned with a top surface of the ramp and one of the plurality of rows, wherein the product rotator continues modification of the orientation of the article from the intermediate orientation toward the second orientation.

26. The vending machine as recited in claim 24, wherein movement of the conveyor modifies the orientation of the article to the second orientation.

27. The vending machine as recited in claim 24, wherein a left-most row and a right-most row of articles are positioned proximal to a left wall and a right wall, respectively, of a vending compartment.

28. The vending machine as recited in claim 27, wherein a right end of the conveyor includes a tip arm arranged such that, when the article is delivered to the conveyor from the right-most row, the tip arm will assist a top of the article in moving in a direction away from the right wall, thereby continuing modification of the orientation of the article from the intermediate orientation toward the second orientation.

29. The vending machine as recited in claim 27, wherein a left end of the conveyor includes a slide arranged such that, when the article is delivered to the conveyor from the left-most row, the slide will assist a bottom of the article in moving in a direction away from the left wall, thereby continuing modification of the orientation of the article from the intermediate orientation toward the second orientation.

30. The vending machine as recited in claim 29, wherein a right end of the conveyor includes a tip arm arranged such that, when the article is delivered to the conveyor from the right-most row, the tip arm will assist a top of the article in moving in a direction away from the right wall, thereby continuing modification of the orientation of the article from the intermediate orientation toward the second orientation.

31. A method of vending articles from a vending machine, comprising:

providing articles on a shelf of the vending machine in a substantially upright position;

tipping the articles as they reach an end of the shelf proximal a conveyor within the vending machine;

delivering an article from the shelf to the conveyor;

horizontally moving the conveyor to orient the article in a second position substantially perpendicular to the upright position;

horizontally transporting the article on the conveyor within the vending machine; and discharging the article from the vending machine in the substantially upright position.

32. The method as recited in claim 31, further comprising vertically transporting the conveyor within the vending machine.

33. The method as recited in claim 31, wherein delivering an article to the conveyor includes tipping the article toward the second position.

34. The method as recited in claim 31, further comprising continually displaying the selected article during tipping, delivering, horizontally moving, and horizontally transporting the article.

* * * * *